United States Patent
Wang (10) Patent No.: US 11,909,897 B2
(45) Date of Patent: Feb. 20, 2024

(54) MOBILE PHONE FILM ATTACHING DEVICE EQUIPPED WITH REINFORCED GLASS FILM

(71) Applicant: Shouyun Wang, Dongguan (CN)

(72) Inventor: Shouyun Wang, Dongguan (CN)

( * ) Notice: Subject to any disclaimer, the term of this patent is extended or adjusted under 35 U.S.C. 154(b) by 219 days.

(21) Appl. No.: 17/397,947

(22) Filed: Aug. 9, 2021

(65) Prior Publication Data
US 2023/0043032 A1 Feb. 9, 2023

(51) Int. Cl.
| | | |
|---|---|---|
| *H04M 1/02* | (2006.01) | |
| *G06F 1/16* | (2006.01) | |
| *B32B 17/00* | (2006.01) | |
| *H04M 1/18* | (2006.01) | |

(52) U.S. Cl.
CPC ........... *H04M 1/0266* (2013.01); *B32B 17/00* (2013.01); *G06F 1/1626* (2013.01); *H04M 1/185* (2013.01); *B32B 2457/20* (2013.01); *G06F 2200/1634* (2013.01)

(58) Field of Classification Search
None
See application file for complete search history.

(56) References Cited

U.S. PATENT DOCUMENTS

| | | | | |
|---|---|---|---|---|
| 11,090,857 | B1* | 8/2021 | Zhong | B29C 63/0004 |
| 2015/0370406 | A1* | 12/2015 | Zhao | G06F 3/0416 |
| | | | | 345/174 |

* cited by examiner

*Primary Examiner* — Frantz Bataille (57) ABSTRACT

A mobile phone screen protector attaching device equipped with a reinforced glass film, which includes: a screen protector attaching device main body, a connector, and a reinforced glass film. The bottom surface of the screen protector attaching device main body is formed with a holding space that matches the contour of the mobile phone and can cover the cell phone. The reinforced glass film is configured inside the area of the holding space with connection to the connector; a stopper is configured inside the area of the holding space; when the screen protector attaching device main body covers the cell phone, of the two relative ends of the reinforced glass film, one end contacts the screen of the cell phone, the other end is separated from the screen of the mobile phone by a gap due to the block of the stopper.

10 Claims, 7 Drawing Sheets

MOBILE PHONE FILM ATTACHING DEVICE EQUIPPED WITH REINFORCED GLASS FILM

BACKGROUND OF INVENTION

1. Field of the Invention

The present invention relates generally to the technical field of mobile phone screen protectors, and more particularly to a mobile phone screen protector attaching device equipped with reinforced glass film.

2. Description of Related Art

Cell phones have become an indispensable tool for daily communication. Due to frequent use, the screen of the mobile phone easily gets dirty or scratched. Therefore, people will usually use a mobile phone screen protector (such as reinforced glass film) to protect the screen. However, when attaching the reinforced glass film, the experience of the operator is essential in judging the smoothness and complete coverage of the reinforced glass film on the mobile phone screen. Less skilled operators will easily cause misalignment of the reinforced glass film and need multiple adjustments or cause bubbles that are difficult to get rid of. Such problems often frustrate the operators.

The inventor had developed a new type of device for attaching mobile phone screen protectors. The device uses a special structure so that the reinforced glass film is fixed on the main body of the screen protector attaching device in a tilted position. When attaching the screen protector, the tilted reinforced glass film can be attached to the mobile phone screen through the second method with perfect alignment and minimum bubbles. The whole process can be completed easily and all at once by the operator, who just needs to cover the screen protector attaching device on the corresponding model of cell phone. Based on this device, the inventor has also developed the following technical solution.

SUMMARY OF THE INVENTION

The purpose of the present invention is to overcome the shortcomings of the prior art and provide a mobile phone film attaching device equipped with reinforced glass film.

In order to solve the above technical problems, the present invention adopts the following technical solutions:

An improved cell phone screen protector attaching device equipped with a reinforced glass film, including a screen protector attaching device main body, a connector, and a reinforced glass film, a holding space disposed in a bottom surface of the screen protector attaching device main body for matching the shape of a mobile phone and covering the mobile phone, wherein the reinforced glass film is arranged in the holding space through a connector, a stopper is provided in an area enclosed by the holding space;

when the screen protector attaching device main body is covered on the mobile phone, one end of the reinforced glass film is in contact with the mobile phone screen, and another end is blocked by the stopper and there is a gap between the mobile phone screen.

More particularly, wherein the stopper is convex blocks or convex bars configured on an outer side of one end of the reinforced glass film.

More particularly, wherein the stopper is convex blocks or convex bars configured on both sides of the reinforced glass film.

More particularly, wherein the stopper is convex bars configured on both sides of the reinforced glass film, the convex bar having an inclined surface that touches the screen of the cell phone.

More particularly, wherein the holding space is enclosed by continuous or discontinuous edgings.

More particularly, wherein the connector is connected to the upper surface of the reinforced glass film, the bottom surface of the reinforced glass film attached with a release film.

More particularly, wherein the release film has an extended portion extending beyond the area of the reinforced glass film.

More particularly, wherein first positioning mechanisms matching each other are formed between the bottom surface of the screen protector attaching device main body and the extended portion.

More particularly, wherein the connector is adhesive layer or adhesive component, the connector is fixed on the bottom surface of the screen protector attaching device main body, the reinforced glass film is adhered inside the area of the holding space and is suspended through the connector.

More particularly, wherein the connector is a tape, a sticky film, or an adhesive plate having one adhesive side and is bendable, the connector is configured on the top surface of the screen protector attaching device main body, and the screen protector attaching device main body is configured with a window or notch that goes from the top down, and the connector is connected to the upper surface of the reinforced glass film through the window or notch.

More particularly, wherein second positioning mechanisms matching each other are formed between the top surface of the screen protector attaching device main body and the connector.

By adopting the aforementioned technical solution, the invention has the following features that are more advantageous than the prior art: after covering the main body of the screen protector attaching device on the cell phone, no manual operations are required to adjust the position of the reinforced glass film in relation to the screen of the cell phone. The position can be predetermined, and the film can be attached accurately all at once, with no worries of misalignment. The steps of operation are simplified and the difficulty of operation is reduced. Also, through the configuration of a stopper, a gap is maintained by the stopper to separate one end of the screen of the mobile phone from the reinforced glass film. Thus, during the process of attachment, one end of the reinforced glass film will firstly touch one end of the screen of the cell phone, and then, through the gravity and self-adhesion property of the reinforced glass film, it is automatically attached to the screen and the air is automatically discharged. The whole screen protector attaching process is completed perfectly all at once.

DETAILED DESCRIPTION OF THE INVENTION

The present invention is a mobile phone screen protector attaching device, which is a tool specially used in attaching a reinforced protective film to the screen of the cell phone. According to the introduction of background technology, in order to realize perfect attachment all at once, normally the second method of attachment is adopted. That is to say, when attaching a protective film to the mobile phone screen, the reinforced glass film is placed in a tilted position in relation to the screen of the cell phone, so that, of the two relative ends of the reinforced glass film, one end will firstly touch the screen of the cell phone, while a certain gap is maintained to separate the other end of the reinforced glass film from the screen of the cell phone. Then, the whole process of attachment and air discharge is automatically completed all at once through the gravity and self-adhesion property of the reinforced glass film. Previously, the inventor provided a technical solution in which a special structure is used in the screen protector attaching device so that the reinforced glass film is fixed inside the main body of the screen protector attaching device in a tilted position. Thus, the reinforced glass film is in a tilted position in relation to the screen surface of the cell phone. In the present invention, the inventor adopts another technical solution, in which, the reinforced glass film is maintained horizontal in relation to the main body of the screen protector attaching device with no incline, whereas the mobile phone is tilted during the attachment. Such a technique can also realize the tilted position of the screen of the mobile phone in relation to the reinforced glass film, and the film attachment can be completed perfectly all at once. Further descriptions are provided below with reference to figures of embodiments.

Embodiment 1

Figure 1:
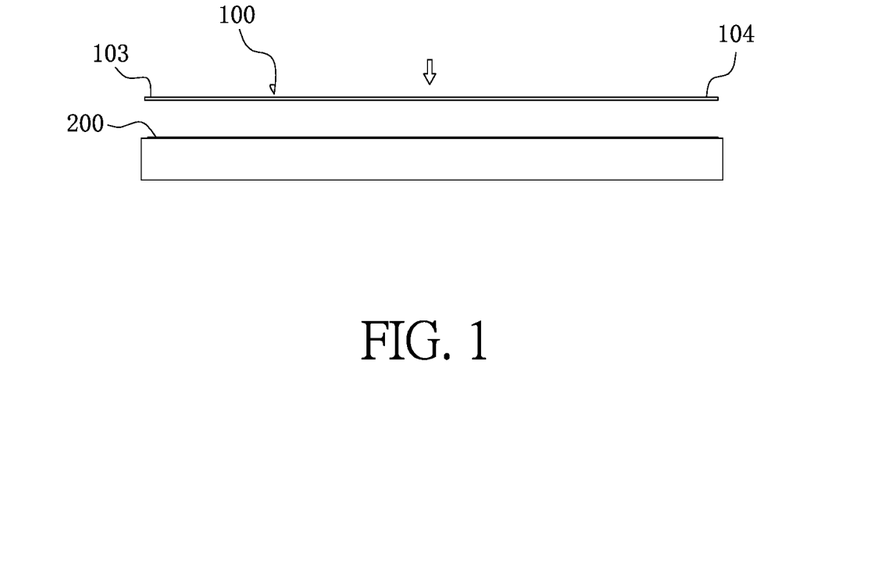
FIG. 1 is a schematic view of the first screen protector attaching method in the prior art.
Figure 2:
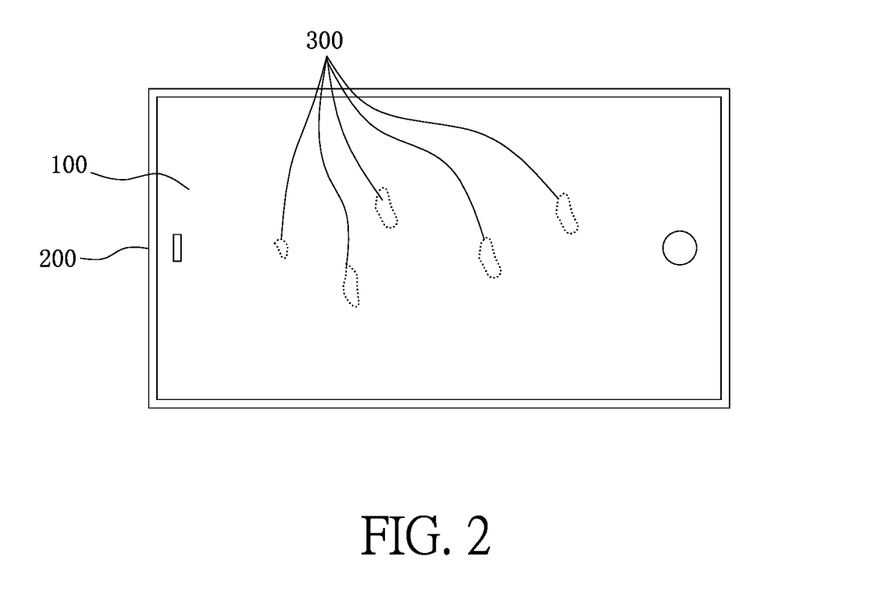
FIG. 2 is a combined view of the mobile phone and the reinforced glass film when using the first method to attach the screen protector.
Figure 3:
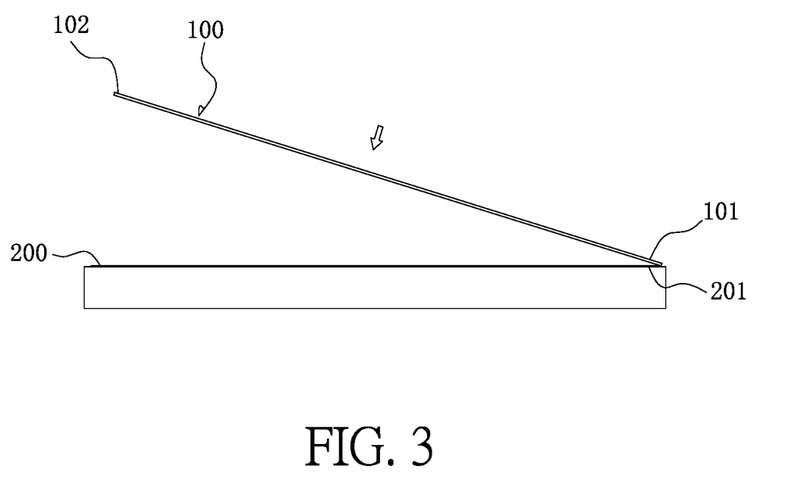
FIG. 3 is a schematic view of the second screen protector attaching method in the prior art.
Figure 4:
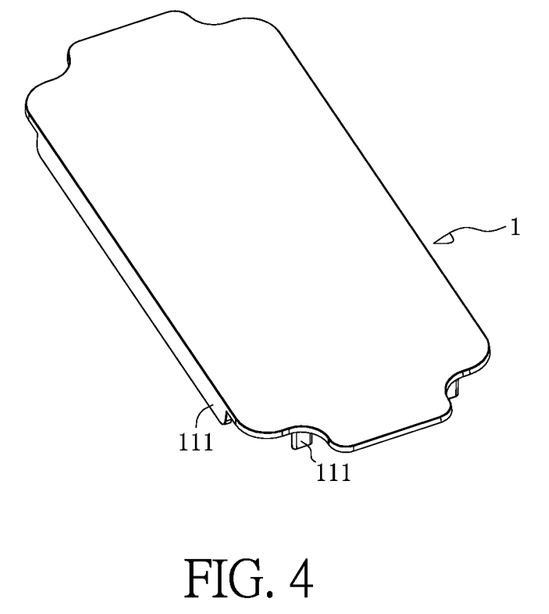
FIG. 4 is a perspective view of Embodiment 1 of the invention.
Figure 5:
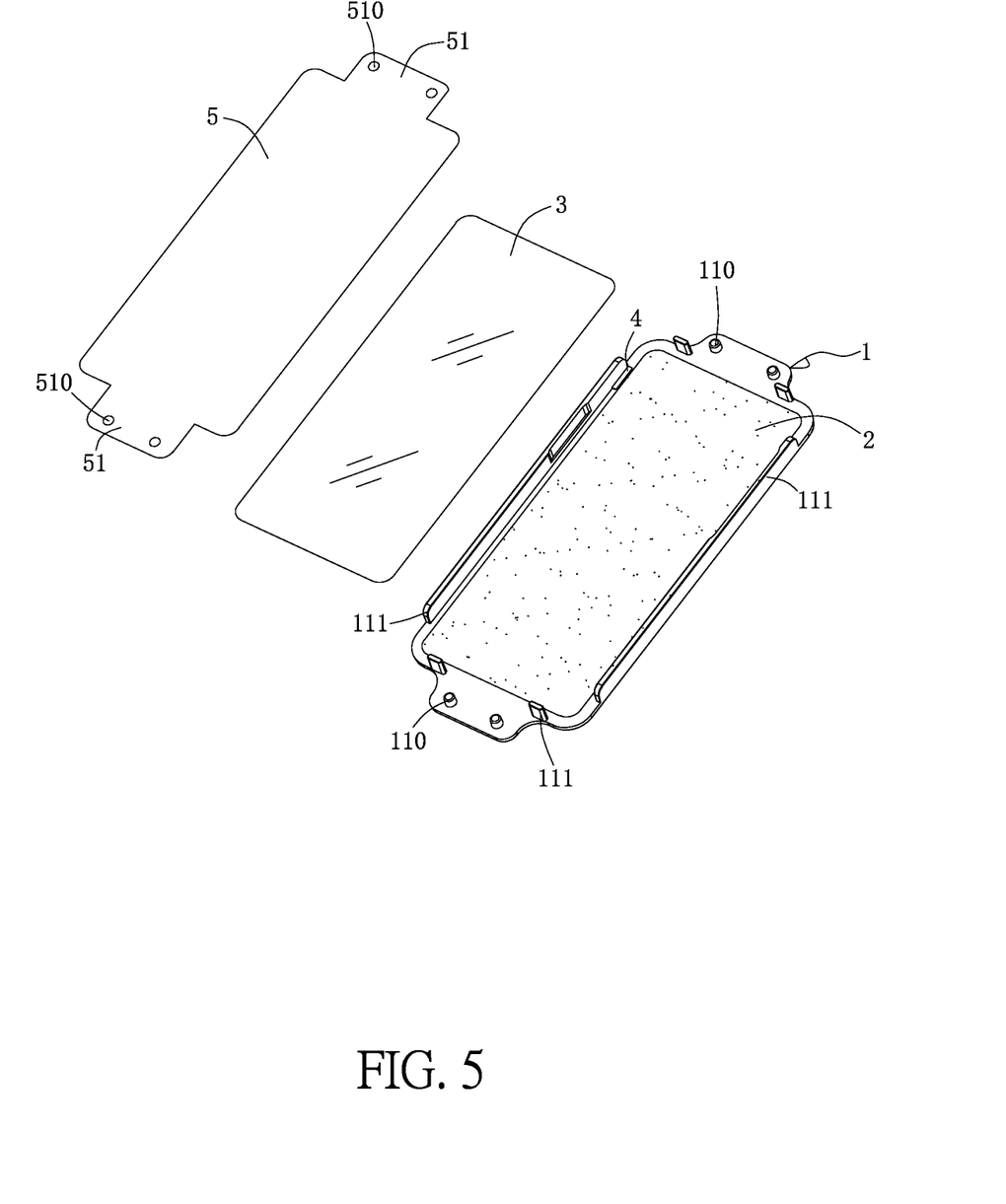
FIG. 5 is an exploded perspective view of Embodiment 1 of the invention from another viewing angle.
Figure 6:
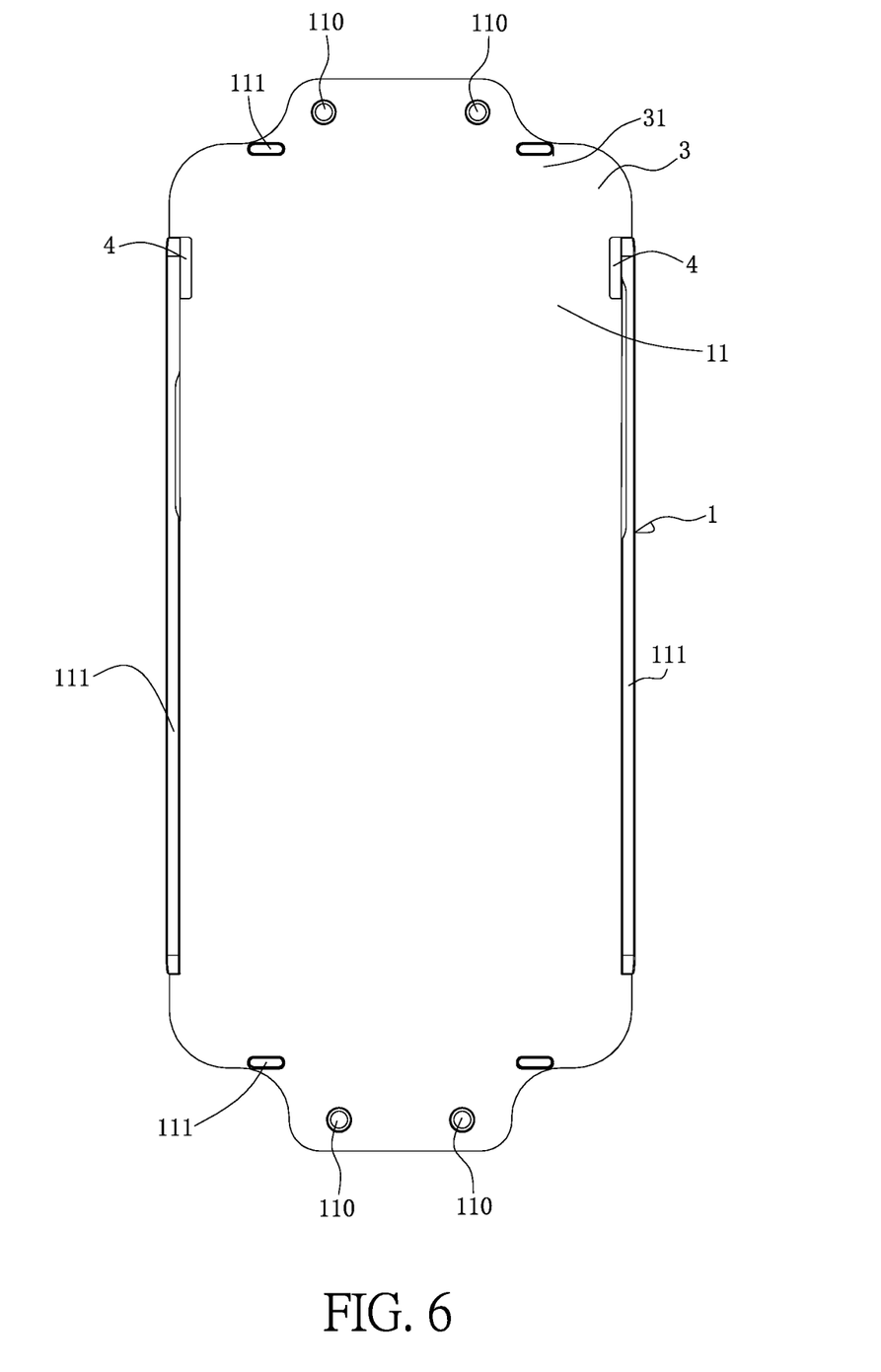
FIG. 6 is a bottom view of the main body of the screen protector attaching device according to Embodiment 1 of the invention.

Referring to FIG. 4 to FIG. 6, Embodiment 1 is a mobile phone screen protector attaching device equipped with a reinforced glass film, which includes: a screen protector attaching device main body 1, a connector 2 and a reinforced glass film 3.

The screen protector attaching device main body 1 can be made of plastic, metal, or ceramic materials.

The bottom surface of the screen protector attaching device main body 1 is formed with a holding space 11 to cover the cell phone. The holding space 1 matches the corresponding model of cell phone. The holding space 11 is usually enclosed by an edging. Specifically, the holding space 11 can be enclosed by continuous or discontinuous edgings 111. In the present embodiment, the holding space 11 is enclosed by discontinuous edgings 111, i.e., enclosed by long or short bar-shaped edgings 111 distributed in different directions on the bottom surface of the screen protector attaching device main body.

The reinforced glass film 3 is configured inside the area of the holding space 11 and connected by the connector 2. In the present embodiment, the connector 2 is an adhesive layer (see the shaded area in FIG. 5). The connector 2 is coated on the bottom surface of the screen protector attaching device main body 1. The reinforced glass film 3 is adhered inside the area of the holding space 11 and suspended by the connector 2. When produced, the connector 2 cannot be excessively sticky. Otherwise, it will be difficult to separate the reinforced glass film 3 from the connector 2 afterwards. It is not necessary that the reinforced glass film 3 is fully attached to the connector 2. A certain adhesive area between the two will be enough to ensure that the reinforced glass film 3 is fixed on the bottom surface of the screen protector attaching device main body 1 through the connector 2.

In addition, the connector 2 can be an adhesive component, such as a double-sided adhesive tape.

When the reinforced glass film 3 is fixed inside the holding space 11 through the connector 2, as the holding space 11 matches the contour of the cell phone, when the screen protector attaching device main body 1 covers on the cell phone, the reinforced glass film 3 is accurately aligned to the screen of the cell phone, with no need for further adjustment.

The area of the holding space 11 is configured with a stopper 4. The stopper 4 has the following function: when the screen protector attaching device main body 1 covers the cell phone, of the two relative ends of the reinforced glass film 3, one end touches the screen of the cell phone, the other end is separated from the screen of the mobile phone by a gap due to the stopper 4, meaning the relative two ends of the reinforced glass film 3 will not touch the screen of the mobile phone at the same time.

In usual cases, the reinforced glass film attached to the screen of a mobile phone product is smaller than the contour of the whole cell phone. Therefore, the stopper 4 can be configured inside the holding space 11 at a position beyond area covered by the mobile phone reinforced glass film 3. With the existence of the stopper 4, when the screen protector attaching device main body 1 covers the cell phone, the stopper 4 will block the cell phone, and prevent the area of the mobile phone screen near the stopper 4 to touch the reinforced glass film 3. As a result, of the two relative ends of the reinforced glass film 3, one end touches the screen of the cell phone, the end is separated from the screen of the mobile phone by a space due to the block of the stopper 4.

As the stopper 4 only needs to block the cell phone, and it is located at a position beyond the area covered by the reinforced glass film 3, its overall size is usually small. For example, in the present Embodiment 1, the stopper 4 are convex blocks configured on both sides on one end of the reinforced glass film 3. Of course, it can also be a convex bar.

A reinforced glass film 3 delivered from the factory has a release film 5 attached to its adhesive side. Before usage, the release film 5 needs to be removed. The release film 5 has an extended portion 51 extending out of the reinforced glass film 3 area. The extended portion 51 can be used as the portion to facilitate removal of the release film 5. The user can use the extended portion 51 to separate it from the reinforced glass film 3 easily. The extended portion 51 also has a positioning function. The bottom surface of the screen protector attaching device main body 1 is formed with a first positioning mechanism that matches the extended portion 51. In the present embodiment, the first positioning mechanism includes: first positioning columns 110 configured on the bottom surface of the screen protector attaching device main body 1 and first positioning holes 510 configured on the extended portion 51. The function of the first positioning mechanism is to realize accurate alignment between the reinforced glass film 3 and the screen protector attaching device main body 1.

In the first positioning mechanism, the edgings 111 can be directly used as the first positioning columns 110 on the bottom surface of the screen protector attaching device main body 1. That is to say, when the holding space 11 is enclosed by discontinuous edgings 111, some short edgings 111 can be reserved. And these short edgings 111 can be directly used as the first positioning columns 110.

Specifically, during production, the reinforced glass film 3 shall be accurately attached to the bottom surface of the screen protector attaching device main body 1. Such attachment can be directly completed by robots to ensure accurate positioning. If robots are not available, or if a positioning benchmark is required, the first positioning mechanism can be used to ensure accurate positioning of the two. As the reinforced glass film 3 is already attached to the release film 5, the first positioning mechanism can realize accurate attachment of the reinforced glass film 3 to the bottom surface of the screen protector attaching device main body 1, and consequently realize accurate alignment of the reinforced glass film 3 to the screen protector attaching device main body 1. In the end, when the screen protector attaching device main body 1 covers the cell phone, the reinforced glass film 3 is accurately aligned to the cell phone.

Figure 9:
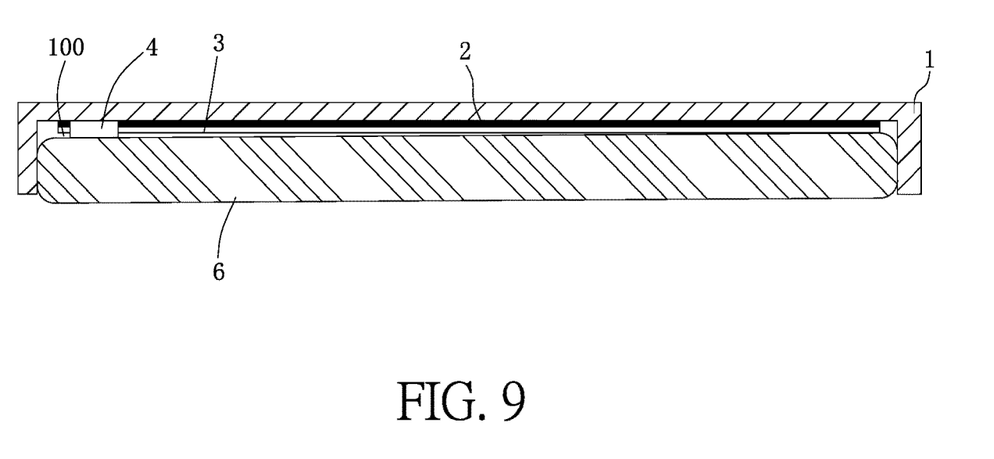
FIG. 9 is a schematic view of the invention in the process of attachment.

Referring to FIG. 9, during the attachment, the mobile phone screen protector attaching device equipped with a reinforced glass film according to Embodiment 1 covers the corresponding model of mobile phone 6. Before covering, the release film 5 attached to the reinforced glass film 3 shall firstly be removed. Through the holding space 11 of the screen protector attaching device main body 1, the mobile phone 6 is accurately positioned. When the screen protector attaching device main body 1 fully covers the mobile phone 6, the reinforced glass film 3 is accurately positioned above the screen of the mobile phone 4. Now, of the two relative ends of the reinforced glass film 3, the lower end touches the edge of the screen of the mobile phone 6, due the existence of the stopper 4, a gap is maintained by the stopper 4 that stops the upper end of the reinforced glass film 3 to touch the upper end of the screen of the mobile phone 6. In this state, the reinforced glass film 3 is kept horizontal, whereas the mobile phone 6 is maintained at a certain angle of inclination due to the existence of the stopper 4. Now, the lower end of the reinforced glass film 3 directly touches the edge of the lower end of the mobile phone 4. Through the self-adhesion property of the reinforced glass film 3, the reinforced glass film 3 is adhered to the screen gradually and automatically from the bottom up, i.e., the adhered area between the reinforced glass film 3 and the screen of the mobile phone 4 is gradually enlarged from the lower end of the reinforced glass film 3 upward. Due to the existence of the stopper 4, the reinforced glass film 3 can not fully adhered to the screen of the mobile phone 6. There is a gap 100 between the two, and automatic attachment can further continue. In the end, remove the screen protector attaching device main body 1, so that the reinforced glass film 3 is separated from the connector 2. When the reinforced glass film 3 loses its connection to the connector 2, under the gravity and self-adhesion force, the reinforced glass film 3 will be fully adhered to the screen of the mobile phone 6. Thus the whole film attachment process is completed.

Embodiment 2

Figure 7:
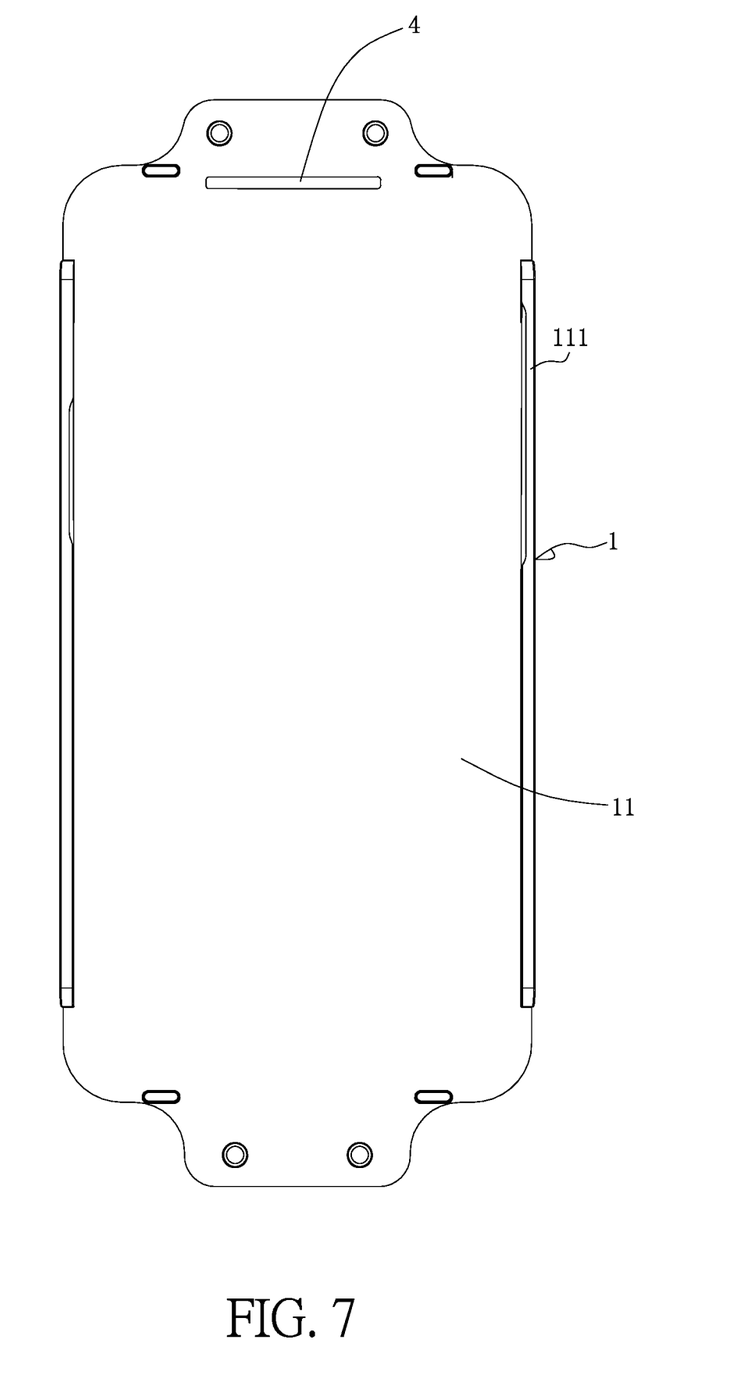
FIG. 7 is a bottom view of the main body of the screen protector attaching device according to Embodiment 2 of the invention.

The structure of Embodiment 2 is similar to Embodiment 1, with the following difference: in the present embodiment, the stopper 4 is convex bars configured on one end of the reinforced glass film 3. The convex bars blocks the corresponding end of the cell phone, and ensures a gap is maintained between the reinforced glass film 3 and the screen of the mobile phone on this end.

Of course, the stopper 4 can also be realized through other methods. For example, the stopper 4 can be convex bars configured on both sides of the reinforced glass film 3. The convex bars have an inclined surface to touch the screen of the cell phone. The inclined surface supports and stops the cell phone, so that the mobile phone is in a tilted position in relation to the reinforced glass film 3. Or, the stopper 4 is not directly configured on the bottom surface of the screen protector attaching device main body 1, but formed on the inner side of the edgings 111, i.e., the inner side of the edgings 111 can be formed with convex blocks or convex bars that protrude inward. In this way, the same effect can be realized.

In the above embodiment, the connector 2 can be configured on the bottom surface of the screen protector attaching device main body 1 directly through coating or attaching. The problem is, in order to remove the screen protector attaching device main body 1 and not pull off the reinforced glass film 3 together, the adhesion between the connector 2 and the reinforced glass film 3 can not be weak, much weaker than the adhesion between the reinforced glass film 3 and the screen of the cell phone. This poses a high requirement for the viscosity of the glue. Therefore, the present invention also provides another method, i.e., to configure the connector 2 on the top surface of the screen protector attaching device main body 1.

Embodiment 3

Figure 8:
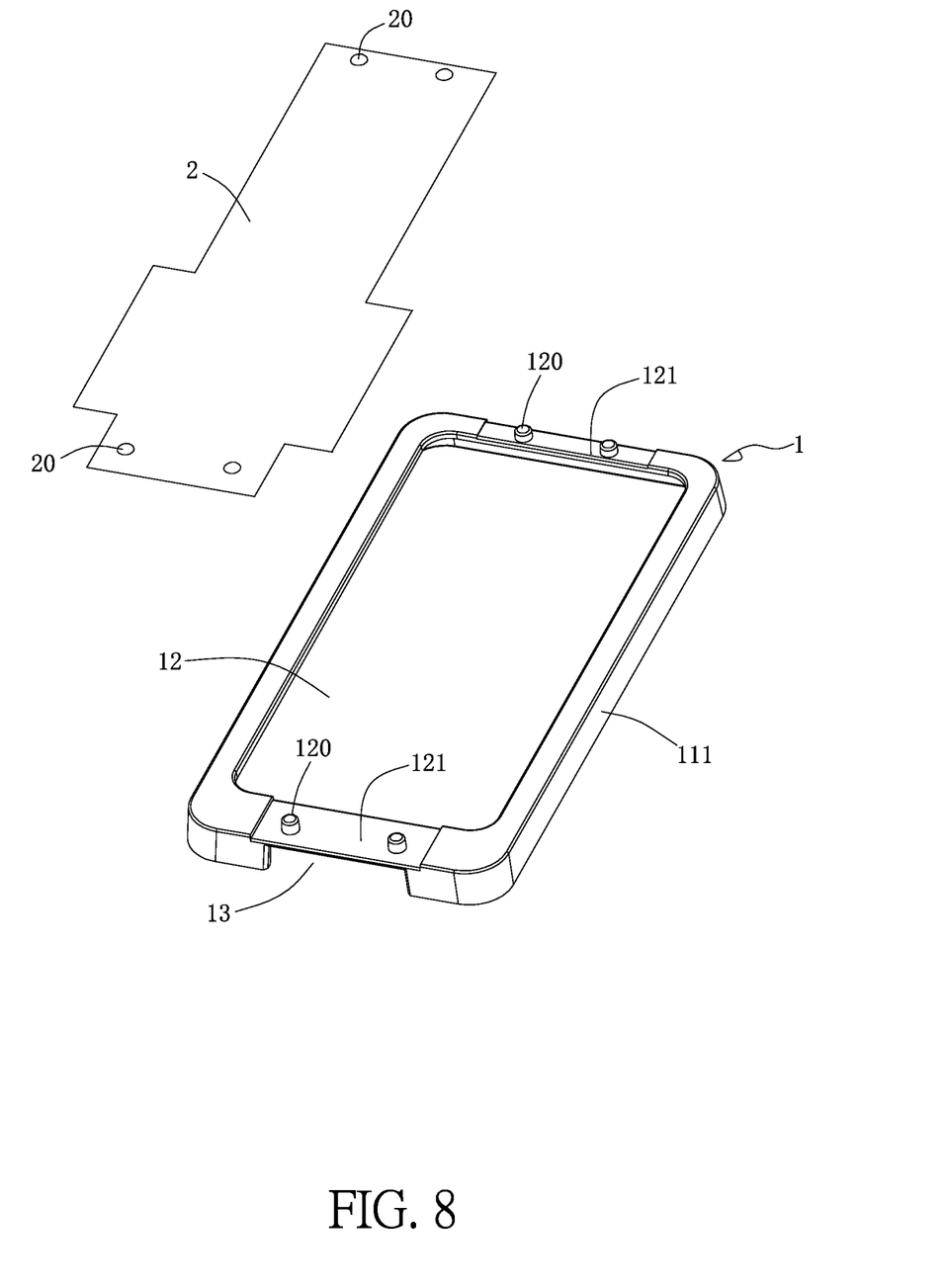
FIG. 8 is a perspective view of the main body of the screen protector attaching device according to Embodiment 3 of the invention.

Referring to FIG. 8, in the present embodiment, the holding space 11 is enclosed by continuous edgings 111, and a notch 13 is maintained. The notch 13 enables the extended portion 51 of the release film 5 to stretch out, so as to facilitate removal of the release film 5.

The connector 2 is a tape, a sticky film or an adhesive plate having one adhesive side and is bendable. The connector 2 is configured on the top surface of the screen protector attaching device main body 1, and the screen protector attaching device main body 1 is configured with a window 12 or notch that goes from the top down. The connector 2 is connected to the upper face of the reinforced glass film 3 through the window 12 or notch. Of course, it will be sufficient as long as part of the area of the reinforced glass film 3 is connected to the connector 2 through the window 12 to prevent the reinforced glass film from falling off the holding space 11.

During production of the present embodiment, when the reinforced glass film 3 is placed inside the holding space 11, part of the adhesive side of the connector 2 goes through the window 12 to be attached to the reinforced glass film 3. Now, the reinforced glass film 3 is fixed in the screen protector attaching device main body 1.

When using the present embodiment, firstly, remove the release film 5 (if any) from the adhesive side of the reinforced glass film 3. Then, cover the present embodiment of a mobile phone screen protector attaching device equipped with a reinforced glass film on the corresponding model of the cell phone. Now, through the self-adhesion of the reinforced glass film 3, the reinforced glass film 3 will be gradually and automatically adhered to the screen, till further attachment is not possible. Now, pull off the connector 2, and the reinforced glass film 3 is separated from the connector 2. After the reinforced glass film 3 loses its connection to the connector 2, under the influence of gravity and self-adhesion, the reinforced glass film 3 will be completely attached to the screen of the mobile phone 6. In the end, remove the screen protector attaching device main body 1 to complete the film attachment. As we see, comparing to the embodiments described above, the present embodiment requires removal of the connector 2. As the connector 2 and the reinforced glass film 3 are respectively located on the top and bottom surfaces of the screen protector attaching device main body 1, when pulling off the connector 2, the reinforced glass film 3 is already completely limited between the screen protector attaching device main body 1 and the screen of the cell phone. Therefore, the removal of the connector 2 will not affect the position of the reinforced glass film 3. Hence, in the present embodiment, the strong glue can be used to fix the connector 2 with the reinforced glass film 3. In this way, during the whole packaging and transportation processes, the reinforced glass film 3 can be stably connected to the connector 2, with no worries of falling-apart.

As the connector 2 has the function to fix the reinforced glass film 3, in order to make sure the connector 2 is fixed with the screen protector attaching device main body 1 stably, in the present embodiment, a second positioning mechanism is configured between the connector 2 and the screen protector attaching device main body 1. The second positioning mechanism includes: second positioning columns 120 configured on the top surface of the screen protector attaching device main body 1 and second positioning holes 20 configured on the connector 2. In addition, a positioning trough 121 can be configured on the top surface of the screen protector attaching device main body 1 with its width matching the connector 2. The function of the second positioning mechanism is to realize accurate alignment between the connector 2 and the screen protector attaching device main body 1.

Other structures of the present embodiment are similar to the Embodiment 1, and Embodiment 2 described above, and are not repeated.

In addition, a new reinforced glass film 3 from the factory will usually be attached with a release film 5 on its adhesive side.

I claim:

1. An improved cell phone screen protector attaching device equipped with a reinforced glass film, including
    a screen protector attaching device main body (1), a connector (2), and a reinforced glass film (3), a holding space (11) disposed in a bottom surface of the screen protector attaching device main body (1) for matching the shape of a mobile phone and covering the mobile phone,
    wherein the reinforced glass film (3) is arranged in the holding space (11) through a connector (2), a stopper (4) is provided in an area enclosed by the holding space (11);
    the connector (2) is connected to an upper surface of the reinforced glass film (3), and a lower surface of the reinforced glass film (3) is attached with a release film piece (5);
    when the screen protector attaching device main body (1) is covered on the mobile phone, one end of the reinforced glass film (3) is in contact with the mobile phone screen, and another end is blocked by the stopper (4) and there is a gap between the mobile phone screen;
    upon full engagement of the screen protector attaching device main body (1) with the mobile phone (6), the reinforced glass film (3) positions above a screen of a mobile phone (6), wherein within the relative upper and lower extremities of the reinforced glass film (3), the lower end contacts a screen edge of the mobile phone (6) while the upper end, due to the presence of the stopper (4), is obstructed by the stopper (4) from making contact with the upper screen edge of the mobile phone (6), thus maintaining a gap; the reinforced glass film (3) directly contacts the lower screen edge of the mobile phone (6) and, by leveraging the inherent self-adhesive property of the reinforced glass film (3), achieves a progressive bottom-up auto-adhesion, but owing to the stopper (4), the reinforced glass film (3) cannot fully adhere to the screen of the mobile phone (6), resulting in a residual gap (100) that prevents further auto-adhesion; finally, after removal of the screen protector attaching device main body (1) and detachment of the reinforced glass film (3) from the connector (2), the reinforced glass film (3), under the influence of gravity and self-adhesiveness, achieves complete adhesion between the film and the screen of the mobile phone (6), concluding the film application process.

2. The improved cell phone screen protector attaching device equipped with the reinforced glass film defined in claim 1, wherein the stopper (4) is convex blocks or convex bars configured on an outer side of one end of the reinforced glass film (3).

3. The improved cell phone screen protector attaching device equipped with the reinforced glass film defined in claim 1, wherein the stopper (4) is convex blocks or convex bars configured on both sides of the reinforced glass film (3).

4. The improved cell phone screen protector attaching device equipped with the reinforced glass film defined in claim 1, wherein the stopper (4) is convex bars configured on both sides of the reinforced glass film (3), the convex bar having an inclined surface that touches the screen of the cell phone.

5. The improved cell phone screen protector attaching device equipped with the reinforced glass film defined in claim 1, wherein the holding space (11) is enclosed by continuous or discontinuous edgings (111).

6. The improved cell phone screen protector attaching device equipped with the reinforced glass film defined in claim 1, wherein the release film (5) has an extended portion (51) extending beyond the area of the reinforced glass film (3).

7. The improved cell phone screen protector attaching device equipped with the reinforced glass film defined in claim 6, wherein first positioning mechanisms matching each other are formed between the bottom surface of the screen protector attaching device main body (1) and the extended portion (51).

8. The improved cell phone screen protector attaching device equipped with the reinforced glass film defined in claim 1, wherein the connector (2) is adhesive layer or adhesive component, the connector (2) is fixed on the bottom surface of the screen protector attaching device main body (1), the reinforced glass film (3) is adhered inside the area of the holding space (11) and is suspended through the connector (2).

9. The improved cell phone screen protector attaching device equipped with the reinforced glass film defined in claim 1, wherein the connector (2) is a tape, a sticky film, or an adhesive plate having one adhesive side and is bendable, the connector (2) is configured on the top surface of the screen protector attaching device main body (1), and the screen protector attaching device main body (1) is configured with a window (12) or notch that goes from the top down, and the connector (2) is connected to the upper surface of the reinforced glass film (3) through the window (12) or notch.

10. The improved cell phone screen protector attaching device equipped with the reinforced glass film defined in claim 8, wherein second positioning mechanisms matching each other are formed between the top surface of the screen protector attaching device main body (1) and the connector (2).

* * * * *